United States Patent Office 3,761,451
Patented Sept. 25, 1973

3,761,451
AMINO ACID-URETHANE POLYMER SOLUTIONS AND SHAPED PRODUCTS
Yasuo Fujimoto, Yokohama, and Masayuki Teranishi, Tokyo, Japan, assignors to Kyowa Kakko Kogyo Co., Ltd., Tokyo, Japan
No Drawing. Filed May 14, 1971, Ser. No. 143,636
Claims priority, application Japan, May 20, 1970, 45/42,410
Int. Cl. C08g 22/00
U.S. Cl. 260—77.5 CA        13 Claims

ABSTRACT OF THE DISCLOSURE

Improved amino acid-urethane polymer compositions characterized by treating the reaction product of an intermediate polymer obtained by the reaction of a polyether polyol or a polyester polyol with a polyisocyanate compound and an amino acid N-carboxy anhydride or a polyamino acid or the shaped products manufactured therefrom with water, polyols or polyamines; and processes for their preparation.

---

The present invention relates to solutions and shaped products of improved polyamino acid-urethane polymers having excellent elongation and resilience and processes for their preparation. This invention is characterized by adding water, a polyol, a polyamine or mixtures thereof to a polymer obtained by reacting an intermediate polymer containing terminal isocyanate groups obtained by the reaction of a polyetherpolyol or a polyesterpolyol or mixtures thereof and an organic polyisocyanate compound with an amino acid N-carboxy anhydride (which will be hereinafter referred to as "ANCA," wherein "A" stands for an amino acid and "NCA" for an N-carboxy anhydride) represented by the general formulae:

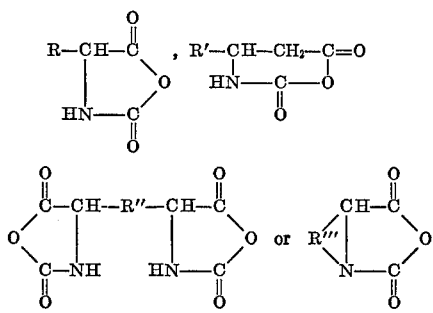

wherein R and R' represent hydrogen or monovalent hydrocarbon groups such as alkyl groups containing from 1 to 6 carbon atoms, aralkyl groups containing from 7 to 10 carbon atoms, aryl groups containing from 6 to 10 carbon atoms, hydroxyalkyl groups of the formula $-C_nH_{2n}OH$ wherein $n$ is an integer from 1 to 6, hydroxyaralkyl groups containing from 7 to 10 carbon atoms, hydroxyaryl groups containing from 6 to 10 carbon atoms, thioalkyl groups containing from 1 to 6 carbon atoms (the thio substituent may be substituted by lower alkyl), amino alkyl groups containing 1 to 6 carbon atoms (the amino substituent may be substituted by lower alkyl or acyl), guanido alkyl groups wherein the alkyl group contains from 1 to 6 carbon atoms (the guanido substituent may be substituted), groups of the formula

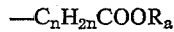

wherein $n$ is an integer from 1 to 6 and $R_a$ is alkyl, cycloalkyl or aralkyl containing from 1 to 8 carbon atoms, nitrogen-containing heterocyclic groups such as indole, tryptophan and the like containing from 4–10 carbon atoms; R" and R''' represent divalent hydrocarbon groups such as alkylene groups containing from 1 to 6 carbon atoms and groups of the formula

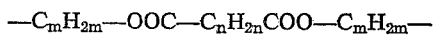

wherein $m$ and $n$ are integers from 1 to 6. These groups may contain other substituents. The intermediate polymer may also be reacted with a polyamino acid solution obtained by the polymerization of ANCA or its derivatives (hereinafter referred to as "polyamino acid"). Further, said polyamino acid may be added to the prepolymer and reacted, and then the ANCA may be added thereto for a further reaction. This invention is also characterized by the addition of water, a polyol or a polyamine to the polymer solution and a film, fiber or thin film form coating obtained from the polymer solution in the conventional manner.

It is known that when a polyamino acid is made into a film or coated onto a substrate cloth such as a woven or non-woven fabric, the moisture permeability, touch, feel, etc. are similar to those of natural leather. However, the polyamino acids have a disadvantage in that their use in clothing is considerably difficult because they do not have sufficient stretchability (elongation) and elasticity recovery.

Further, when a polyamino acid is coated onto a woven or non-woven fabric to be used as an artificial leather it is necessary to use an additional adhesive because the polyamino acid itself is not sufficiently adhesive, and the selection of a proper adhesive is difficult.

As a result of extensive studies of methods of improving these disadvantages, the present inventors have found that when a solution of a modified amino acid-urethane polymer is treated with water, a polyol or a polyamine or mixtures thereof, the elongation, resiliency, and adhesiveness, are greatly improved.

The present invention will now be explained in detail.

An appropriate amount of a hydroxyl-terminated polyether polyol or a hydroxyl-terminated polyester polyol and an appropriate amount of an organic polyisocyanate are reacted to prepare an intermediate polymer containing isocyanate groups at the terminals (which will be referred to hereinafter as "prepolymer"), and an appropriate amount of ANCA is reacted with the prepolymer, whereby a polymer solution is obtained. In place of the ANCA, a polyamino acid solution obtained by polymerizing ANCA with an appropriate polymerization initiator may be used. Further, said polyamino acid may be added to the prepolymer and reacted and then the ANCA may be added thereto for a further reaction.

It is possible to prepare a polyamino acid polymer having improved elongation, resiliency, etc. and shaped products thereof by treating the polymer solution, or the film, fiber or thin film form coating shaped from said solution with water, polyols, polyamines or mixtures thereof.

The polyether polyols useful in the present invention are substantially of the same structure as the compounds obtained by a dehydration-condensing of polyols, have a molecular weight of from 200 to 10,000 and consist of aliphatic, alicyclic, and aromatic hydrocarbon residues bonded with ether bonds, and contain at least two terminal OH groups. With regard to the number of terminal OH groups, it is two per molecule when divalent hydrocarbon residues are used and three or more when trivalent or tetravalent hydrocarbon residues are used.

A polyether polyol having a ratio of molecular weight to number of OH groups in the range of 300 to 1,200 is particularly desirable.

Typical polyether polyols useful in the present invention include polyether polyols obtained by a dehydration condensation reaction of a single compound or a mixture of compounds selected from polyols having from 2 to 20 carbon atoms, for example, alkylene and polyalkylene glycols such as ethylene glycol, propanediols (1,2- or 1,3-), butanediols (1,2-, 1,3-, 1,4-, etc.), pentanediols, hexanediols, heptanediols, octanediols, cyclopentanediols, di(hydroxymethyl) cyclopentanes, cyclohexanediols, di-(hydroxymethyl)cyclohexanes, diethylene glycol, triethylene glycol, dipropylene glycol, tripropylene glycol, dibutylene glycol, tributylene glycol, di(trimethylene glycol), di(tetramethyl glycol), di(hexamethylene glycol); dioxyacetone; di(hydroxycyclohexyl)methanes (3,3'-, 4,4'-, etc.); aromatic diols such as dihydroxybenzenes, ω,ω'-di(hydroxphenyl)methanes, dihydroxytoluenes, di(hydroxymethyl)-benzenes, ω,ω'-di(hydroxymethylphenyl)methanes, tri(hydroxymethyl)benzenes, dihydroxynaphthalenes, dihydroxy Decalins; glycerin; triols having 3 to 20 carbon atoms such as butanetriols, pentanetriols (such as 1,2,5-pentanetriol, trimethylolethane, etc.), hexanetriols (such as 1,3,5-hexanetriol, trimethylolpropane, etc.), trihydroxycyclohexanes, tri(hydroxymethyl)cyclohexanes, pentaerythritol; or polyether polyols obtained from the ring-cleaved polymers of alkylene oxides, having from 2 to 8 carbon atoms, for example, cyclic ethers such as ethylene oxide, propylene oxide, oxetane, butylene oxide, tetrahydrofuran, tetrahydropyran, 1,2-epoxypentane, 2,3-epoxypentane, 1,2-epoxyhexane, 2,3-epoxyhexane, 1,2-epoxyheptane, 1,2-epoxyoctane, isobutylene epoxide, 2,5-dimethyltetrahydrofuran, 2,4-dimethyl-3-hydroxymethyltetrahydrofuran, dioxane, or mixtures thereof; copolymers of said polyols and said alkylene oxides prepared in the presence of appropriate catalysts or initiators for example, trialkylamines such as trimethylamine, triethylamine; inorganic bases such as potassium hydroxide; and halo compounds such as boron trifluoride; or mixtures of one or more of the above polyether polyols.

It has been found, however, that the linear compounds result in polymers having relatively larger elongations than branched-chain compounds and are therefore preferred. Further, if desired, the terminal OH groups can be converted to alkoxy groups, cycloalkoxy groups, aryloxy groups or aralkoxy groups by the addition of monohydroxy compounds having from 1 to 16 carbon atoms.

The polyester polyols useful in the present invention consist of a polybasic organic acid and a polyol with a molecular weight in the range of from 200 to 10,000 and at least two terminal OH groups wherein aliphatic, alicyclic, aromatic hydrocarbon residues are bonded with ester bonds or both ester bonds and ether bonds.

With regard to the number of terminal OH groups, it is two per molecule when divalent hydrocarbon residues are used and three or more per molecule when trivalent or tetravalent hydrocarbon residues are used and, if desired, in some cases carboxylic groups may be present at the terminals.

A polyester polyol having a ratio of molecular weight to number of OH groups in the range of 300 to 1,200 is particularly desirable.

Typical polyester polyols useful in the present invention can be obtained by reacting the above mentioned polyols; alkylene oxides; polyolefin oxides; polyether polyols or mixtures thereof with polybasic organic acids having from 2 to 20 carbon atoms such as oxalic acid, malonic acid, succinic acid, maleic acid, fumaric acid, glutaric acid, α-ketoglutaric acid, α-hydroxyglutaric acid, adipic acid, pimelic acid, suberic acid, azelaic acid, sebacic acid, isosebacic acid, brassylic acid, diglycolic acid, itaconic acid, citraconic acid, mesaconic acid, glutaconic acid, malic acid, tartaric acid, acetondicarboxylic acid, dimeric acid, dimerized linoleic acid, muconic acid, α,α'-dimethylmuconic acid, phthalic acid, isophthalic acid, terephthalic acid, toluene dicarboxylic acid (such as 2,5-), biphenyldicarboxylic acid, naphthalenedicarboxylic acid (such as 1,8-), di(carboxymethyl)benzene (such as 1,4-), cyclopentanedicarboxylic acid (such as 1,3-), cyclohexanedicarboxylic acid (such as 1,4-), di(carboxymethyl)cyclohexane (such as 1,4-), citric acid, isocitric acid, aconitic acid, tricarballyic acid, oxalosuccinic acid, benzenetricarboxylic acid (such as 1,2,4-), cyclohexanetricarboxylic acid (such as 1,2,4-), and the like, or mixtures thereof; anhydrides of said organic acids or mixtures thereof; or mixtures of organic acids and acid anhydrides. Further, the polyester polyols of the present invention can be prepared by a ring-cleaved polymerization of a lactone or a derivative thereof, such as propiolactone, butyrolactone, valerolactone, dimethylcaprolactone, or mixtures thereof, utilizing a small amount of the above mentioned diols, triols, or amines as initiators. The polyester polyols can be also produced from polyesters such as succinic acid dialkylester, adipic acid dialkylester, phthalic acid dialkylester, terephthalic acid dialkylester, ethylene glycol ester of 4,4-bis(hydroxyphenyl)butyric acid, diethylene glycol ester of di[4,4-bis(hydroxyphenyl)valeric acid], castor oil, and the like.

Any well-known organic polyisocyanate can be used as the organic polyisocyanate but preferably aliphatic, alicyclic or aromatic diisocyanates are used. Further, triisocyanates and tetraisocyanates can be used, but they have a tendency to reduce the elongation when used in large amounts.

Typical organic polyisocyanates useful in the present invention include aromatic diisocyanates such as:

tolylenediisocyanates (2,4-; 2,5-; or 2,6-; etc),
phenylenediisocyanates (1,3-; 1,4-; etc.),
1,3-dimethylbenzene-2,4-diisocyanate,
1,3-dimethylbenzene-4,6-diisocyanate,
1,4-dimethylbenzene-2,5-diisocyanate,
1-ethylbenzene-2,4-diisocyanate,
1-isopropylbenzene-2,4-diisocyanate,
1,3-diethylbenzene-2,4-diisocyanate and its isomers,
1,3-diisopropylbenzene-2,4-diisocyanate and its isomers,
ω,ω'-(p-xylylene)-diisocyanate,
ω,ω'-,m-xylylene)diisocyanate,
1-chloro-2,4-phenylenediisocyanate,
naphthalene diisocyanates (such as 1,4-; 1,5-; 2,6-; 2,7-; etc),
ω,ω'-diisocyanate-1,4-dimethylnaphthalene,
1,1'-dinaphthyl-2,2'-diisocyanate,
biphenylenediisocyanates (such as 2,4'-; 4,4'-; etc.),
3,3'-dimethyl-4,4'-biphenylenediisocyanate,
3,3'-dimethoxy-4,4'-biphenylenediisocyanate,
3,3'-dichloro-4,4'-biphenylenediisocyanate,
2-nitro-4,4'-biphenylenediisocyanate,
diphenylmethane-4,4'-diisocyanate,
3,3'-dimethyl diphenylmethane-4,4'-diisocyanate,
2,2'-dimethydiphenylmethane-4,4'-diisocyanate,
diphenyldimethylmethane-4,4'-diisocyanate,
2,5,2',5'-tetramethyldiphenylmethane-4,4'-diisocyanate,
3,3'-dimethoxydiphenylmethane-4,4'-diisocyanate,
4,4'-dimethoxldiphenylmethane-3,3'-diisocyanate,
2,2'-dimethyl-5,5'-dimethoxydiphenylmethane-4,4'-diisocyanate,
3,3'-dichlorodiphenyldimethylmethane-4,4'-diisocyanate,
benzophenone-3,3'-diisocyanate,
3-nitrotriphenylmethane-4,4'-diisocyanate,
4-nitrotriphenylmethane-4,4'-diisocyanate,
1-methylbenzene-2,4,6-triisocyanate,
naphthalene-1,3,7-triisocyanate,
biphenyl-2,4,4'-triisocyanate,
diphenylmethane-2,4,4'-triisocyanate,
3-methyldiphenylmethane-4,6,4'-triisocyanate,
triphenylmethane-4,4',4''-triisocyanate,
diphenyl-4,4'-diisocyanate-N-carbamic acid chloriue,
tri-(p-isocyanylphenyl)methane,
4,4'-(γ,γ'-diisocyanate propyl)biphenyl, and the like;

and alkyl and cycloalkyl diisocyanates and substituted diisocyanates thereof such as ω,ω'-diisocyanate-1,2-dimethylcyclohexane, ω,ω'-diisocyanate-1,4-dimethylcyclohexane, 4,4'-dicyclohexylmethanediisocyanate, methylcyclohexyldiisocyanate (hydrogenated tolylenediisocyanate), isophoronediisocyanate, dimeryldiisocyanate prepared from a 36 carbon dimer aliphatic dibasic acid sold under the trademark "DDI diisocyanate,"

polymethylenepolyphenylisocyanate,
N,N'-(4,4'-dimethyl-3,3'-diphenylenediisocyanate) uredione (i.e. tolylenediisocyanate dimer),
4,4',4''-trimethyl-3,3',3''-triisocyanate-2,4,6-triphenyl-cyanurate (i.e. tolylenediisocyanate trimer),
polymeric-polyisocyanate (a polyisocyanate produced from aniline and a formaldehyde condensatioin product),
ethanediisocyanate, propane diisocyanate,
butenediisocyanate, butanediisocyanate,
thiodiethyldiisocyanate,
pentanediisocyanate,
β-methylbutanediisocyanate,
hexamethylenediisocyanate,
ω,ω'-dipropyletherdiisocyanate,
thiodipropyldiisocyanate,
heptanediisocyanate,
2,2-dimethylpentanediisocyanate,
3-methoxyhexanediisocyanate,
octanediisocyanate,
2,2,4-trimethylpentanediisocyanate,
decanediisocyanate,
3-butoxyhexanediisocyanate,
1,4-butyleneglycoldipropylether-ω,ω'-diisocyanate,
dodecanediisocyanate,
thiodihexyldiisocyanate, or aliphatic diisocyanates having carboxylic acid ester groups.

However, in selecting the diisocyanate, it should be noted that generally polymers comprising a polyisocyanate and a polyether polyol or a polyester polyol as a base, that is, the so-called polyurethanes have the disadvantage of undergoing deterioration or discoloration when exposed to atmospheric conditions such as sunlight and the like. In particular, these tendencies are observed when aromatic polyisocyanates, such as tolylene diisocyanates or diphenylmethane-4,4'-diisocyanates are used. Therefore, it is desirable to select the polyisocyanate in accordance with the proposed use of the product. When aliphatic diisocyanates, particularly aliphatic diisocyanates having an ester group are used the thus obtained amino acid-urethane polymer undergoing considerably less discoloration on exposure to sunlight. Further, these polymers exhibit other desirable properties, such as improved solvent resistance and the like, which are not obtained when other diisocyanates not containing the ester group are used.

The aliphatic diisocyanates are represented by the general formula:

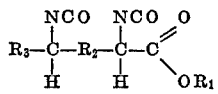

wherein $R_1$ represents an aliphatic hydrocarbon or substituted hydrocarbon group such as an alkyl group containing from 1 to 20 carbon atoms or an alkoxyalkyl group having a total carbon content of from 2 to 8 carbon atoms, an alicyclic hydrocarbon or substituted hydrocarbon group such as a cyclo alkyl group containing from 4 to 10 intracyclic carbon atoms or a monocarbocyclic aryl, aliphatic-aromatic or aromatic-aliphatic hydrocarbon or substituted hydrocarbon group containing from 6 to 12 carbon atoms, $R_2$ represents a divalent aliphatic hydrocarbon such as an alkylene group containing from 1 to 8 carbon atoms and $R_3$ represents a hydrogen atom, a lower aliphatic hydrocarbon such as an alkyl group containing from 1 to 3 carbon atoms or one of the following groups:

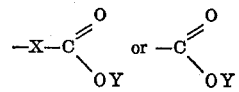

wherein X represents a divalent lower aliphatic hydrocarbon such as an alkylene group containing from 1 to 3 carbon atoms and Y is independently selected from the group of substituents defined above for $R_1$; $R_1$ and Y may also bear inert substituents such as halogen, nitro or alkoxy groups.

Typical aliphatic diisocyanate compounds having ester groups are listed below. By using any of these compounds in place of the compounds shown in the examples, similar desirable effects can be observed. The methyl, ethyl, n-propyl, i-propyl, n-butyl and its isomers, n-pentyl and its isomers, n-hexyl and its isomers, n-octyl and its isomers, n-decyl and its isomers, n-dodecyl and its isomers, stearyl, palmityl, methoxymethyl, ethoxymethyl, 2-methoxyethyl, 2-ethoxyethyl, 2-propoxyethyl, 2-butoxyethyl, 3-methoxypropyl, 3-ethoxypropyl, 4-methoxybutyl, 4-ethoxybutyl, phenyl, benzyl, o-tolyl, p-tolyl, phenylethyl, p-tolylmethyl, o-tolylmethyl, o-(2-chlorotoly), 2-choroethyl, 2-bromoethyl, 2-chloropropyl, 3-chloropropyl, 1,2-dichloropropyl, 2,3-dichloropropyl, cyclobutyl, cyclopentyl, cyclohexyl, cycloheptyl, cyclooctyl, cyclodecyl, cylopentylmethyl, cyclohexylmethyl, cyclobutylmethyl, o-methylcyclohexyl and its isomers and o-methylcyclohexylmethyl and its isomers esters of 2,6-diisocyanate caproic acid (lysinediisocyanate), 2,4-diisocyanate butyric acid, 2,5-diisocyanate valeric acid (ornithindiisocyanate), 2,5-diisocyanate caproic acid, 2,7-diisocyanate heptanoic acid, 2,5-diisocyanate heptanoic acid or 2,8-diisocyanate caprylic acid; and the dimethyl, diethyl, dipropyl (di-n-propyl or di-i-propyl), dibutyl(n-, i-, sec- or tert-), dioctyl, didecyl, didodecyl, distearyl, diphenyl, dibenzyl, di(o-tolyl), di(p-tolyl), di(β-phenylethyl), di(p-tolylmethyl), di[o-(2-chlorotolyl)], di(2-chloroethyl), di-(2-chloropropyl), di (3-chloropropyl), di(2,3-dichloropropyl), di(methoxymethyl), di(2-methoxyethyl), di(2-ethoxyethyl), di(2-propoxyethyl), di(2-propoxyethyl), di(2-butoxyethyl), di-(cyclohexyl), di(cyclopentyl) and di(cyclohexylmethyl) esters of 2,4-diisocyanate glutaric acid, 2,5-diisocyanate adipic acid, 2,6-diisocyanate pimelic acid, 2,7-diisocyanate suberic acid, 2,9-diisocyanate sebacic acid, 2,4-diisocyanate adipic acid and 2,4-diisocyanate pimelic acid; and the such mixed diesters as methyl-ethyl, methyl-propyl, methyl-butyl, ethyl-propyl, ethyl-butyl, n-propyl-i-propyl, propyl-butyl, phenyl-octyl, benzyl-stearyl and methyl-benzyl diesters of the above diisocyanates.

The compounds employed may be optical isomers or optically inactive. In the formation of a prepolymer having terminal isocyanate groups, the reaction between the polyether polyol or polyester polyol and the polyisocyanate can be carried out without the addition of a solvent or with a suitable inert solvent. Suitable solvents are those which are inactive with respect to the starting material compounds under the reaction conditions but are capable of dissolving at least one of the raw materials. Suitable solvents are, for example, ethers such as dioxanes; amides such as dialkylformamide, dialkylacetoamide; aromatic hydrocarbons such as xylene, toluene; esters such as ethylene glycol monoethyl ether acetate, 2-ethoxyethyl-acetate, etc.; halogenated hydrocarbons such as chloroform, dichloroethane, tetrachloroethane, trichlene, perchlene, etc.

The reaction proceeds sufficiently at room temperature without any catalyst, but the reaction temperature is usually raised or a suitable catalyst is used which will not substantially interrupt the next polymerization reaction of the ANCA.

The well-known catalysts used in the preparation of polyurethanes, for example, organic bases, organometallic compounds and the like can be employed to accelerate the reaction rate. Typical catalysts include amines and substituted amines such as trimethylamine,
triethylamine,
tripropylamine (n- or iso-),
tributylamine (n-, iso-, tert- or sec-),
tripentylamine,
trihexylamine,
tricyclohexylamine,
tricyclopentylamine,
N,N-dimethyl laurylamine,
triethanolamine,
methyldiethanolamine,
dimethylethanolamine,
ethylidethanolamine,
diethylethanolamine,
tris(2-oxypropyl)amine,
N,N-dimethylcyclohexylamine,
triethylenediamine,
N,N,N',N'-tetramethylmethanediamine,
N,N,N',N'-tetraethylmethanediamine,
N,N,N',N'-tetramethylethylenediamine,
N,N,N',N'-tetraethylenediamine,
N,N,N',N'-tetrakis(2-hydroxypropyl)-ethylenediamine
N,N,N',N'-tetramethylpropylenediamine,
N,N,N',N'-tetramethyl-1,3-butanediamine,
N,N,N',N'-tetramethylhexamethylenediamine,
N,N,N',N'',N''-pentamethyldiethylenetriamine,
N,N,N',N'',N''',N'''-hexamethyltriethylenetetramine,
N,N,N'N'-tetraethyl-1,3-butanediamine,
dimethylamine,
diethylamine,
dipropylamine,
dibutylamine,
dipentylamine,
dihexylamine,
dicyclopentylamine,
dicyclohexylamine,
triazine,
morpholine,
N-methylmorpholine,
N-ethylmorpholine,
piperidine,
piperazine,
N-methylpiperazine,
N,N'-diethylpiperazine,
pyridine,
dibenzylamine,
tribenzylamine,
N-methylaniline,
N-ethylaniline,
N,N-dimethylaniline,
N,N-diethylaniline,
diphenylamine,
triphenylamine,
N,N,N',N'-tetramethyl-p-phenylenediamine,
N,N,N',N'-tetraethylphenylenediamine;

dialkyl tin diacetates such as dibutyl (or propyl, ethyl or methyl) tin diacetate; dialkyl tin dibutyrates such as dibutyl (or propyl, ethyl or methyl) tin dibutyrate; dialkyl tin divalerates such as dibutyl (or propyl, ethyl or methyl) tin divalerate; dialkyl tin dioctanoates such as dibutyl (or propyl, ethyl or methyl) tin dioctanoate; dialkyl tin laurates such as dibutyl (or propyl, ethyl or methyl) tin dilaurate; dialkyl tin trichlorides such as butyl (or propyl, ethyl or methyl) tin trichloride, dialkyl tin dichlorides such as dibutyl (or propyl, ethyl or methyl) tin dichloride; dialkyl tin di-2-ethylhexanoates such as dibutyl (or propyl, ethyl or methyl) tin di-2-ethylhexanoate; metallic napthenates such as zinc naphthenate, nickel naphthenate, cobalt naphthenate, iron naphthenate, tin naphthenate, lead naphthenate, tin oleate; metallic octanoates such as iron octanoate, nickel octanoate, cobalt octanoate, tin octanoate; ferrocene; copper salt of 2-ethylhexoic acid; iron acetylacetonate; and the like. These catalysts can be used alone or in mixture and may be diluted with or dissolved in or added to a suitable solvent. The catalyst is used in an amount corresponding to not more than 10% by mole weight based on the molecular weight of the polyether polyol or polyester polyol initially used. In order to retain the isocyanate groups in the prepolymer, it is particularly desirable to use the polyisocyanate in sufficient amount to consume all of the available free hydroxyl groups but in a sufficiently small amount to avoid undesirable side reactions. Moreover, when the reaction is not allowed to go to completion in preparing the prepolymer, the isocyanate groups and the hydroxyl groups are retained in the prepolymer. Therefore, in that case, it is not always necessary that the number of isocyanate groups be in excess over the number of hydroxyl groups. Accordingly it is not always necessary that the amount of diisocyanate compound used be greater than that of the polyol used, and the ratio of NCO/OH can suitably be in the range of between 0.2 and 4.0. When it is desired that the stretchability and resilience should be greater, it is preferable that the ratio of NCO–OH be in the range of between 1.0 to 3.0.

The prepolymer having terminal isocyanate groups is reacted with ANCA in the presence of a polymerization initiator or alternatively, with a polyamino acid obtained by polymerizing ANCA. Also if desired, the prepolymer can be reacted with a polyamino acid and then further reacted with ANCA. As the amino acid starting material for ANCA represented by said general formula, acidic amino acids, neutral amino acids and basic amino acids can be used.

Examples of ANCA prepared from acidic amino acids include the NCA of ω-substituted ester derivatives of amino acids represented by the general formulae:

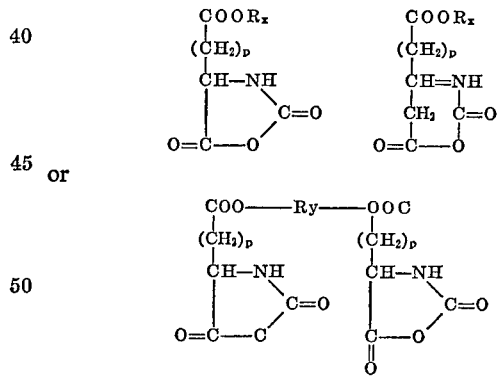

wherein $p$ represents an integer from 1 to 6; $R_x$ represents a monovalent hydrocarbon group such as a saturated or unsaturated aliphatic, alicyclic or aromatic group (including aliphatic groups having aromatic substituents and aromatic groups having aliphatic substituents) such as alkyl, cycloalkyl or aralkyl containing up to about 8 carbon atoms. These groups may also bear inert substituents such as halogen, nitro, cyano, alkoxy and carboalkoxy groups. $R_y$ represents a divalent hydrocarbon groups such as an alkylene group containing from 1 to 6 carbon atoms. Typical compounds include, for example, NCA's of ω-substituted esters of aspartic acid, glutamic acid, 2-aminoadipic acid, 2-aminopimelic acid, etc. The ANCA can be the NCA of a neutral amino acid such as glycine, alanine, α-aminobutyric acid, 2,5-diaminoadipic acid, 2,5-diaminopimelic acid, 2,6-diaminopimelic acid, valine, norvaline, leucine, isoleucine, norleucine, phenylglycine, phenylalanine, tryptophan, proline, β - aminobutyric acid, β-aminoisovaleric acid, β-aminocaproic acid, O-substituted serine, O-substituted homoserine, O-substituted threonine, O-substituted tyrosine, O-substituted p- hydroxyphenylglycine, O-substituted hydroxyproline, O-substituted hydroxytryptophan, S - substituted cysteine, cystine, methionine, etc. Typical useful NCA's of basic amino acids include, for example, NCA's of $N^{rm}$-substituted histidine, $N^\delta$ - substituted-$\alpha,\gamma$-diaminobutyric acid, $N^\delta$-substituted ornithine, $N^\epsilon$-substituted lysine, $N^{guanido}$-substituted arginine, etc. As the substitution protective groups of the functional groups of said amino acids, any of the well-known protective groups in the field of amino acids and peptides can be used.

The polymerization initiator can be any of the known initiators for polymerizing ANCA, including organic bases and organometallic compounds such as alkyl lithium, dialkyl zinc, monoalkyl zinc alkoxide, sodium alkoxide, potassium alkoxide, etc.

In the practice of this invention, ANCA or polyamino acid or mixtures thereof are generally used in amounts from 0.2-20 times the amount of the prepolymer having terminal isocyanate groups. However, the ratio of components can be varied as desired, depending upon the physical properties desired in the final polymer, for example, stretchability, adhesiveness, elastic resilience, feel, moisture permeability, touch, etc. Generally, when the amount of ANCA or polyamino acid utilized is high, the physical properties of the polyamino acid are predominant. On the other hand, when the amount of ANCA or polyamino acid is low, the physical properties of the polyurethane will predominate, and will reflect the kinds of polyether polyol, polyester polyol and diisocyanate used. The polymerization temperature and time depend upon the combination of reactants, solvent used, etc., but when the reaction is carried out at a high temperature for a long period of time, considerable discoloring sometimes occurs. Therefore, it is preferred to carry out the reaction at temperature less than 200° C. for a period of time of 1 to 20 hours. Since the reaction proceeds even at low temperatures, the reaction can be carried out at temperatures below room temperature for more than 20 hours. Usually, it is preferable to use a temperature of 0-120° C. When the prepolymer having terminal isocyanate groups is polymerized with a polyamino acid which has been prepared separately according to conventional processes, good results can be obtained by carrying out the reaction under the same conditions as described above but, in that case, it is desirable to complete the reaction by heating the reaction system.

The amount of polymerization initiator used in the reaction of the ANCA or polyamino acid with the urethane prepolymer depends upon the specific reaction mixture components and the initiator employed. Generally it is desirable to use the initiator in amounts from about 0.001 to 1.0 times (by weight) of the amount of ANCA or the constituent amino acid monomer used. When the polyamino acid is reacted with the prepolymer, it is not necessary to add the initiator thereto. Polymerization is usually carried out in an inert solvent capable of dissolving at least one of the reactants. Suitable solvents include N,N-dialkylamines such as dialkyl formamide, dialkyl acetamide, N-alkyl-2-pyrrolidone, halogenated hydrocarbons such as chloroform, 1,2-dichloroethane trichloroethylene, tetrachloroethylene, tetrachloroethane, methylene chloride, and dioxane, ethyl acetate, etc. These solvents can be used alone or in mixtures. Other solvents such as benzene, toluene, nitrobenzene, chlorobenzene, can also be added thereto. There is no particular limitation to the amount of such polymerization solvent to be used, so long as the amount is enough, to form a good polymerization system, but usually the solvent is so used that the solid content is between 1 and 50%. The improved polyamino acid-urethane polymer solution, film, fiber or thin film form coating can be obtained by treating the polyamino acid-urethane polymer solution prepared by the above-mentioned method; the film or fiber prepared from the solution in the conventional manner; or the thin film form coating prepared by coating the solution onto a thin plate form or a substrate cloth such as a woven or non-woven fabric by known processes or prepared by placing the film form product on a substrate with water, polyols, polyamines or mixtures thereof.

The polyols or polyamines useful in the present invention include hydrazine and aliphatic, alicyclic, or aromatic (inclusive of aliphatic-aromatic, aromatic-aliphatic) polyols; polyamines or mixtures thereof. Aliphatic diols and diamines, having from 1 to 10 carbon atoms are especially preferable if improved weather resistance properties are desired.

Typical polyols and polyamines useful in the present invention include: alkylene and polyalkylene glycols such as ethylene glycol, propylene glycol, butylene glycol, trimethylene glycol, tetramethylene glycol, pentamethylene glycol, hexamethylene glycol, octamethylene glycol, di(ethylene glycol), tri(ethylene glycol), di(propylene glycol), tri(propylene glycol), di(butylene glycol, tri(butylene glycol), di(tetramethylene glycol), tri(tetramethylene glycol), di(hexamethylene glycol), tri(hexamethylene glycol); aryl and substituted aryl polyols such as dihydroxybenzenes (such as o-, m-, and p-); alkaryl and substituted alkaryl polyols such as di(hydroxymethyl)benzenes (such as o-, m- and p-); aralkyl and substituted aralkyl polyols such as 4,4'-dihydroxyldiphenylmethane, 4,4' - di(hydroxymethyl)diphenylmethane; cycloalkylene diols, for example, cyclohexanediols (such as 1,3-; 1,4-; etc.), 4,4' - dihydroxydicyclohexylmethane, di(hydroxymethyl) cyclohexanes (such as 1,3-; 1,4-; etc.), 4,4'-di hydroxymethyl)dicyclohexylmethane; polyalkylene triols, for example, glycerin, trimethylolethane, trimethylolpropane, hexanetriol (such as 1,3,5, etc.) and the like; amines and polyamines such as hydrazine, diaminomethaneethylenediamine, propylenediamines (such as i- and n-), tetramethylenediamine, pentamethylenediamine, hexamethylenediamine, diaminocyclohexanes (such as 1,3-; 1,4-; etc.) di(aminomethyl) cyclohexanes (such as 1,2-; 1,3-; 1,4-; etc.) di($\beta$-aminoethyl) cyclohexanes (such as 1,2-; 1,3-; 1,4-; etc.), 4,4' - diaminodicyclohexylmethane(dicyclohexylmethane-4,4'-diamine), 4,4' - di(aminomethyl)dicyclohexylmethane, phenylenediamines (such as o-, m- and p-), di(aminomethyl) benzene (such as o-, m- and p-), di($\beta$-aminoethyl) benzenes (such as o-, m- and p-), biphenylenediamine (such as 3,3'-, 4,4'-, etc.), 4,4'-diaminodiphenylmethane (diphenylmethane-4,4'-diamine), ethylenetetramine, tri-amino-hexane, and the like. The polyols and polyamines may also contain inert substituents such as lower alkyl groups; halogen groups; lower alkoxy groups; or nitro groups and mixtures thereof.

Generally the polyols and polyamines may be added directly, or in solution in an appropriate solvent, or in gaseous form by means of a thermal treatment.

When shaped articles are treated, the solvent should be one which is non-reactive with respect to the shaped articles, but capable of dissolving the polyol or polyamine. When a polymer solution is treated, the solvent should be one which is capable of being dissolved in the polymer solution but is non-reactive with respect to the polymer itself.

Suitable solvents include water; aliphatic, alicyclic or aromatic hydrocarbons having from 5 to 30 carbon atoms; ethers having from 2 to 20 carbon atoms; or amides (including substituted amides) of lower aliphatic acids. Typical examples are as follows: Alkanes such as pentane (and its isomers), hexane (and its isomers), heptane( and its isomers), octane (and its isomers), nonane (and its isomers), decane (and its isomers); halogenated hydrocarbons such as methylenechloride, chloroform, 1,2-dichloroethane, trichloroethylene, tetrachloroethane, tetrachloroethylene; aromatic hydrocarbons such as benzene, toluene, xylene (and its isomers); cycloalkanes such as cyclohexane, methylcyclohexane; amides such as N,N-diloweralkylformamide, N,N - diloweralkylacetamide; dioxane; tetrahydrofuran; ethers such as ethylene glycoldimethylether, diethyleneglycoldibutylether, and the like.

When the polyamino acid-urethane polymer solution is treated with water, polyols or polyamines, the treating agent is usually used in such an amount that the ratio of the number of NCO in the polymer solution to the number of OH or $NH_2$ in the agent may be 0.2 to 4.0. But the ratio is varied depending upon the kind of the employed treating agent, the desired physical property of the polymer, the reaction conditions of the treatment, etc.

When high elongation and shrinkage are particularly desired, water, polyols, polyamines or the mixture thereof is added at a ratio of NCO to OH or $NH_2$ of 0.5 to 3.0. Alternatively, the treating agent is gradually added to the reaction solution until NCO is completely consumed.

Further, when the shaped products are treated with water, polyols or polyamines, the amount or the concentration of the treating agent is also varied depending upon the kind thereof, the desired physical property of the polymer, the reaction conditions, etc. Since water, polyols and polyamines are enough effective even in a small amount, the treatment can be effectively carried out using a highly diluted solution, however, the treating agents are usually used at a concentration of 1 to 100%.

Any suitable method for treating the shaped products with water, polyols, polyamines, or mixtures thereof, can be utilized. For example, the shaped polymer product can be dipped into water, a polyol or a polyamine or a solution prepared by dissolving said polyol or polyamine in an appropriate solvent or water. The polyol, polyamine or solution can also be coated or sprayed on the shaped polymer products or the products can be placed in the vapor of said compounds. If desired, conventional ultraviolet ray absorbing agents, stabilizers, anti-oxidants, coloring agents, and the like, can be added to improve resistance to heat and light.

The temperature and time depend upon the combination of reactants and the contacting method, but when the reaction is carried out at a high temperature for a long period of time considerable discoloring sometimes occurs. Therefore, it is preferred to carry out the reaction at temperatures less than 200° C. for a period of time of 0.2 to 10 hours. Usually, it is preferable to use a temperature of 0–150° C.

Synthetic leathers prepared from the products of this invention have a feel, drape, moisture permeability and touch which are similar to those of natural leather, and also exhibit improved resistance to light and heat, elongation and resilience. They are suitable for use in shoes, bags, clothing and the like.

Examples showing embodiments of the present invention are given below, but the present invention is not restricted thereto.

In the examples the tensile strength is calculated according to the formula $$P_m/f_0$$

wherein $P_m$ represents the maximum load added to a test piece of film which is a plane-parallel plate when the test piece is stretched until broken and $f_0$ represents the original cross-sectional area of the test piece.

The shrinkage coefficient is calculated according to the formula $$\frac{L_a - L_b}{L_a - L_0} \times 100$$

wherein $L_0$ represents the original length of the test piece, $L_a$ represents the length to which the test piece was stretched and $L_b$ represents the length of the test piece measured one minute after being released from length $L_a$. However, the percentage of stretch, $$\frac{(L_a - L_0)}{L_0} \times 100 \text{ (percent)}$$

used in measuring the shrinkage coefficient was varied in the examples, theretofore, this percentage is indicated in parentheses below the corresponding shrinkage coefficient.

Elongation is calculated according to the formula:

$$\frac{L - L_0}{L_0} \times 100$$

wherein $L_0$ represents the original length of the test piece and L represents the length of the test piece stretched until broken.

EXAMPLE 1

26.0 g. of polyoxytetramethylene glycol obtained by subjecting tetrahydrofuran to a ring-cleavage polymerization and having an OH value of 51 are reacted with 9.6 g. of lysine diisocyanate methylester at 100° C. for two hours with stirring to give a prepolymer having terminal isocyanate groups. Then 450 g. of 1,2-dichloroethane, 70 g. of N,N-dimethylformamide and 1.31 g. of triethylamine as a polymerization initiator are immediately added thereto and then 73.0 g. of γ-methyl-L-glutamate N-carboxy anhydride added thereto. The reaction mixture is stirred at at room temperature for one hour and then the temperature is allowed to rise to 80–85° C. for a period of two hours to give a viscous solution. On molding, the product forms a colorless, transparent film. The film shows very little yellowing and has very good light resistance, when compared with films prepared by the same process from other diisocyanates such as 4,4′ - diphenylmethanediisocyanate or tolylenediisocyanate.

A water-treated amino-urethane polymer film is obtained by immersing a sample of the above film in water for about five hours and drying with hot air (70° C.). This film is compared with a film of poly-γ-methyl-L-glutamate and with an untreated film of the amino acid-urethane polymer and the results are shown below. (The thickness of the films is 0.04–0.05 mm.).

The poly-γ-methyl-L-glutamate film:

| Property | Direction | |
|---|---|---|
| | Longitudinal | Lateral |
| Tensile strength | 3.5 kg./mm.$^2$ | 4.0 kg./mm.$^2$ |
| Elongation | 90% | 110% |
| Shrinkage coefficient | Shrinkage was hardly observed. (80%). | Shrinkage was hardly observed. (001%). |

The untreated amino acid-urethane polymer film:

| Property | Direction | |
|---|---|---|
| | Longitudinal | Lateral |
| Tensile strength | 2.0 kg./mm.$^2$ | 2.3 kg./mm.$^2$ |
| Elongation | 200% | 250% |
| Shrinkage coefficient | Shrinkage was hardly observed. (150%). | Shrinkage was hardly observed. (200%). |

The amino acid-urethane polymer film treated with water:

| Property | Direction | |
|---|---|---|
| | Longitudinal | Lateral |
| Tensile strength | 2.2 kg./mm.$^2$ | 2.5 kg./mm.$^2$ |
| Elongation | 350% | 400%. |
| Shrinkage coefficient | 50% (300%) | 45% (350%). |

EXAMPLE 2

25 g. of polyoxytetramethylene-glycol having an OH value of 40, obtained by subjecting tetrahydrofuran to a ring-cleavage polymerization, is reacted with 8.5 g. of lysine diisocyanate ethylester and 25 g. of dioxane at 100° C. for two hours with stirring to give a prepolymer having terminal isocyanate groups. Immediately, a polymer solution obtained by separately polymerizing 70.0 g. of γ-benzyl-L-glutamate N-carboxy anhydride in 450 g. of 1,2-dichloroethane and 3.5 g. of tri-butylamine as a polymerization initiator was added thereto.

The mixture solution is heated to 80 to 85° C. for one hour with stirring to give a polymerization solution. A transparent film is obtained from the polymerization solution in the conventional manner.

A sample of this amino acid-urethane polymer film is dipped into a 5% ethylenediamine aqueous solution for 60 minutes, washed with water and dried with hot air (70° C.). The treated film is compared with an untreated film and with a poly-γ-benzyl-L-glutamate film and the results are shown below. (The thickness of the films is 0.04 to 0.05 mm.).

The poly-γ-benzyl-L-glutamate film:

| Property | Direction | |
|---|---|---|
| | Longitudinal | Lateral |
| Tensile strength | 2.0 kg./mm.$^2$ | 2.5 kg./mm.$^2$. |
| Elongation | 150% | 170%. |
| Shrinkage coefficient | Shrinkage was hardly observed. (130%). | Shrinkage was hardly observed. (150%). |

The untreated amino acid-urethane polymer film:

| Property | Direction | |
|---|---|---|
| | Longitudinal | Lateral |
| Tensile strength | 1.5 kg./mm.$^2$ | 1.6 kg./mm.$^2$. |
| Elongation | 200% | 220%. |
| Shrinkage coefficient | Shrinkage was hardly observed. (180%). | Shrinkage was hardly observed. (200%). |

The amino acid-urethane polymer film treated with a 5% ethylenediamine aqueous solution:

| Property | Direction | |
|---|---|---|
| | Longitudinal | Lateral |
| Tensile strength | 2.0 kg./mm.$^2$ | 2.2 kg./mm.$^2$. |
| Elongation | 400% | 430%. |
| Shrinkage coefficient | 60% (370%) | 60% (400%) |

EXAMPLE 3

20.0 g. of polypropylene glycol having a molecular weight of 1,500 and 9.0 g. of lysine diisocyanate cyclohexylester are reacted at 100° C. with stirring for 1.5 hours and then dissolved in 40 g. of N,N-dimethylacetoamide to give a prepolymer having terminal isocyanate groups. 140 g. of chloroform and 40 g. of dioxane are then added. Further 35 g. of γ-cyclohexyl-L-glutamate N-carboxy anhydride are added followed by 0.5 g. of triethylenediamine, a polymerization initiator, and stirring is continued for five hours. The mixture is then heated close to the boiling point for two hours to give a viscous solution. A transparent film is obtained from the polymerization solution in the conventional manner.

A sample of this amino acid-urethane polymer film is dipped into a toluene solution of 10% 1,4-diaminocyclohexane for 60 minutes, washed with water and dried with hot air (from 70° C. to 80° C.). The treated film is compared with an untreated film and the results are shown below.

The untreated amino acid-urethane polymer film:

| Property | Direction | |
|---|---|---|
| | Longitudinal | Lateral |
| Tensile strength | 2.0 kg./mm.$^2$ | 1.8 kg./mm.$^2$. |
| Elongation | 210% | 230%. |
| Shrinkage coefficient | Shrinkage was hardly observed. (200%). | Shrinkage was hardly observed. (220%) |

The amino acid-urethane polymer film treated with diaminocyclohexane:

| Property | Direction | |
|---|---|---|
| | Longitudinal | Lateral |
| Tensile strength | 2.7 kg./mm.$^2$ | 3.0 kg./mm.$^2$. |
| Elongation | 450% | 500%. |
| Shrinkage coefficient | 50% (400%) | 50% (450%). |

EXAMPLE 4

46 g. of polyoxytetramethylene glycol, having an OH value of 40.0, obtained by subjecting tetrahydrofuran to a ring-cleavage polymerization, is reacted with 8.5 g. of ornithine diisocyanate ethylester and 40 g. of dioxane at 100° C. for 15 minutes with stirring to give a prepolymer having terminal isocyanate groups. Immediately, a polymer solution obtained separately by polymerizing 70.0 g. of γ-methyl-L-glutamate N-carboxy anhydride in 450 g. of 1,2-dichloroethane and 2.0 g. of triethylamine as a polymerization initiator is added thereto.

The mixture solution is heated to 75 to 80° C. with stirring for one hour to give a polymer solution.

Thereafter, water is added to the polymer solution so that the total amount of water present in the polymer solution is 200 to 300 p.p.m. and the mixture is stirred at room temperature for five hours and then heated to 80 to 85° C. for one hour with stirring to obtain a polymer solution with a viscosity of 1800–1850 centipoises (hereinafter centipoises will be represented as cps.). A transparent film is obtained from the polymer solution in the conventional manner.

The treated transparent film was compared with an untreated film prepared from the same polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 1.7 kg./mm.$^2$ | 1.9 kg./mm.$^2$. |
| Elongation | 170% | 180% |
| Shrinkage coefficient | Shrinkage was hardly observed. (150%). | Shrinkage was hardly observed. (160%). |

The amino acid-urethane polymer film treated by adding water:

| Property | Direction | |
|---|---|---|
| | Longitudinal | Lateral |
| Tensile strength | 2.0 kg./mm.$^2$ | 2.1 kg./mm.$^2$. |
| Elongation | 350% | 360% |
| Shrinkage coefficient | 40% (300%) | 45% (300%). |

EXAMPLE 5

50 g. of dioxane are reacted with a mixture of 24 g. of polyoxyhexamethylene glycol having a molecular weight of 2,000 and 4.5 g. of lysine diisocyanatemethylester at 80° C. for one hour with stirring to give a prepolymer having terminal isocyanate groups. Immediately, a polymer solution obtained separately by polymerizing 30.0 g. of γ-benzyl-D-glutamate N-carboxy anhydride in 600 g. of 1,2-dichloroethane and 0.8 g. of triethylamine as a polymerization initiator is added thereto and the mixture is stirred at room temperature for three hours. 0.05 ml. of ethylene glycol are then added and the stirring is continued at room temperature for 13 hours, and then the solution is heated at 80° C. for one hour to give a polymer solution with a viscosity of 800 cps.

A transparent film is obtained from the polymer solution in the conventional manner.

The treated transparent film is compared with an untreated film prepared from the polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 1.8 kg./mm.$^2$ | 1.9 kg./mm.$^2$. |
| Elongation | 180% | 210% |
| Shrinkage coefficient | Shrinkage was hardly observed.(170%). | Shrinkage was hardly observed. (200%). |

The amino acid-urethane polymer film treated with ethylene glycol:

| Property | Direction | |
|---|---|---|
| | Longitudinal | Lateral |
| Tensile strength | 2.1 kg./mm.² | 2.3 kg./mm.². |
| Elongation | 450% | 400%. |
| Shrinkage coefficient | 40% (430%) | 41% (380%). |

EXAMPLE 6

200 g. of polyoxypropylene glycol having a molecular weight of 1500 and 48 g. of tolylene diisocyanate are reacted at 100° C. for 4 hours with stirring to give a prepolymer having terminal isocyanate groups. Immediately, 800 g. of 1,1,2,2-tetrachloroethane are added thereto followed by 250 g. of Nᵋ-carbobenzoxy-L-lysine N-carboxy anhydride and the mixture is, and stirred at room temperature for one hour. 150 g. of N,N-dimethylacetamide are then added thereto followed by 2.35 g. of tri-n-butylamine, a polymerization initiator, and stirring is continued. The mixture is then heated close to the boiling point for one hour to give a viscous solution. 0.05 ml. of hydrazine are added to the polymer solution and the mixture is stirred at room temperature for five hours, and then heated at 80° C. for one hour to give a polymer solution with a viscosity of 1500 cps.

A transparent film is obtained from the polymer solution in the conventional manner.

The treated transparent film is compared with an untreated film prepared from the polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 1.7 kg./mm.² | 1.9 kg./mm.². |
| Elongation | 250% | 260%. |
| Shrinkage coefficient | Shrinkage was hardly observed (230%). | Shrinkage was hardly observed (240%). |

The amino acid-urethane polymer film treated with hydrazine:

| Property | Direction | |
|---|---|---|
| | Longitudinal | Lateral |
| Tensile strength | 2.3kg./mm.² | 2.4 kg./mm.². |
| Elongation | 450% | 460%. |
| Shrinkage coefficient | 55% (400%) | 55% (400%). |

EXAMPLE 7

65 g. of polyoxytetramethylene glycol having an OH value of 40.0, obtained by subjecting tetrahydrofuran to a ring-cleavage polymerization, is reacted with 23.0 g. of lysine diisocyanate methylester and 75 g. of dioxane at 100° C. for two hours with stirring, to give a prepolymer having terminal isocyanate groups. Immediately, a polymer solution obtained separately by polymerizing 40.0 g. of γ-methyl-D-glutamate N-carboxy anhydride using 8.4 ml. of tri-i-propylamine as a polymerization initiator in 1100 g. of 1,2-dichloroethane, is added thereto.

The mixture solution is stirred at room temperature for 30 minutes and then 239 g. of γ-methyl-L-glutamate N-carboxy anhydride are added thereto and the mixture is reacted at room temperature for three hours, and then heated at 75 to 80° C. for one hour to give a polymer solution.

0.05 ml. of hexamethylenediamine are added to the polymer solution, and while following the residual isocyanate groups in the polymer solution by infrared absorption spectrum, additional increments of 0.01 ml. of hexamethylenediamine are added every 30 minutes until the isocyanate absorption peak disappears to give a polymer solution with a viscosity of 550 cps.

A transparent film is obtained from the polymer solution in the conventional manner.

The treated transparent film is compared with an untreated film prepared from the polymer solution and the results are shown below: (The thickness of the films is 0.04 to 0.05 mm.)

The untreated amino acid-urethane polymer film:

| Property | Direction | |
|---|---|---|
| | Longitudinal | Lateral |
| Tensile strength | 1.75 kg./mm.² | 1.90 kg./mm.². |
| Elongation | 200% | 250%. |
| Shrinkage coefficient | Shrinkage was hardly observed (180%). | Shrinkage was hardly observed (230%). |

The amino acid-urethane polymer film treated with hexamethylenediamine:

| Property | Direction | |
|---|---|---|
| | Longitudinal | Lateral |
| Tensile strength | 2.1 kg./mm.² | 2.2 kg./mm.². |
| Elongation | 450% | 470%. |
| Shrinkage coefficient | 45% (400%) | 43% (420%). |

EXAMPLE 8

A polymer solution is obtained according to the procedures of Example 7 except that benzidine is used in place of hexamethylenediamine. The viscosity of this polymer solution is 500 cps.

A transparent film is obtained from the polymer solution in the conventional manner and is tested and the results are shown below. (The thickness of the film is 0.04 to 0.05 mm.)

An amino acid-urethane polymer film treated with benzidine:

| Property | Direction | |
|---|---|---|
| | Longitudinal | Lateral |
| Tensile strength | 2.0 kg./mm.² | 2.1 kg./mm.². |
| Elongation | 400% | 450%. |
| Shrinkage coefficient | 40% (380%) | 43% (430%). |

EXAMPLE 9

44 g. of polyoxytetramethylene glycol having an OH value of 51.0, obtained by subjecting tetrahydrofuran to a ring-cleavage polymerization, 10.0 g. of 4,4'-diphenylmethane diisocyanate and 40 g. of dioxane are reacted at 100° C. for 40 minutes with stirring to give a prepolymer having terminal isocyanate groups. Immediately 450 g. of 1,2-dichloroethane are added thereto followed by 73.0 g. of γ-methyl-L-glutamate-N-carboxy anhydride and stirring at room temperature for one hour. 70 g. of N,N-dimethylformamide are then added thereto followed by 1.31 g. of triethylamine, a polymerization initiator, and stirring is continued for 10 hours. The mixture is then heated close to the boiling point for one hour to give a viscous solution.

0.085 g. of 4,4'-diamino-3,3'-dichlorodiphenylmethane are added to the polymer solution and the mixture is stirred at room temperature for 8 hours, and then heated at 80° C. for one hour to give a polymer solution with a viscosity of 280 cps.

A transparent film is obtained from the polymer solution in the conventional manner.

The treated transparent film is compared with an untreated film prepared from the polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 1.9 kg./mm.² | 1.9 kg./mm.². |
| Elongation | 200% | 220%. |
| Shrinkage coefficient | Shrinkage was hardly observed (180%). | Shrinkage was hardly observed. (200%). |

The amino acid-urethane polymer film treated with 4,4'-diamino-3,3'-dichlorodiphenyl methane:

| Property | Direction | |
|---|---|---|
| | Longitudinal | Lateral |
| Tensile strength | 2.1 kg./mm.² | 2.2 kg./mm.² |
| Elongation | 500% | 520% |
| Shrinkage coefficient | 50% (480%) | 55% (500%) |

EXAMPLES 10–17

Prepolymers are prepared according to the following procedure using the components as shown in Table 1. A diisocyanate component, a solvent A and a catalyst are added to the polyether polyol component, and stirred at 80 to 100° C. for 120 minutes to obtain prepolymers.

A solvent B as shown in Table 2 is added to the prepolymer, and then the ANCA component is added thereto and stirred at room temperature for one hour. A polymerization initiator is then added and the reaction is continued for 5 hours and then heated at 80° C. for one hour to obtain a polymer solution.

A treating agent as shown in Table 2 is added to the polymer solution and stirred at room temperature for one to two days and then heated at 80° C. for one hour to obtain a polymer solution.

A colorless, transparent film prepared from the polymer solution has far improved elongation and resilience as compared with the film obtained from the untreated polymer solution.

TABLE 1

| Ex. | Diisocyanate component | Polyether diol component |
|---|---|---|
| 10 | 4,4'-diphenylmethane diisocyanate, 10 g. | Polyoxytetramethylene glycol (M.W. 1,350), 24 g. |
| 11 | 2,4-tolylene diisocyante, 28 g. | Polyoxypropylene glycol (M.W. 1,500), 100 g. |
| 12 | Lysine diisocyanate ethylester, 8.5 g. | Polyoxybutylene glycol (M.W. 2,000), 40 g. |
| 13 | Ornithine diisocyanate ethylester, 8.9 g. | Polyoxypropyleneoxybutylene glycol (M.W. 1,380), 46 g. |
| 14 | Hexane-1,6-diisocyanate, 10.0 g. | Polyoxypentamethylene glycol (M.W. 500), 50 g. |
| 15 | Cyclohexylmethane-4,4'-diisocyanate, 10.0 g. | Polyoxyhexamethylene glycol (M.W. 600), 35 g. |
| 16 | 4,4'-diphenylmethane diisocyanate, 8.5 g. | Polyoxypentamethylene glycol (M.W. 1,600), 35 g. |
| 17 | Lysine diisocyanate methylester, 9.0 g. | Polyoxytetramethylene-oxyethylene glycol (M.W. 2,000), 40 g. |

| Ex. | Catalyst | Solvent A |
|---|---|---|
| 10 | None | Dioxane, 40 g. |
| 11 | do | N,N-dimethylformamide, 30 g. / Dioxane, 30 g. |
| 12 | Triethylamine, 0.05 g. | N,N-dimethylformamide, 30 g. |
| 13 | N-methylmorpholine, 0.04 g. | 2-ethoxyethylacetate, 50 g. |
| 14 | Dimethylethanolamine, 0.05 g. | Dioxane, 30 g. |
| 15 | Dibutyl tin dilaurate, 0.03 g. | Do. |
| 16 | None | Do. |
| 17 | do | Do. |

TABLE 2

| Ex. | ANCA component | Solvent B |
|---|---|---|
| 10 | γ-ethyl-L-glutamate NCA, 75 g. | Perchlene, 150 g. / 1,2-dichloroethane, 450 g. |
| 11 | γ-isobutyl-L-glutamate NCA, 70 g. | Trichloroethylene, 880 g. |
| 12 | γ-cyclohexyl-L-glutamate NCA, 70 g. | 1,2-dichloroethane, 850 g. |
| 13 | β-ethyl-L-aspartate NCA, 65 | Trichloroethylene, 100 g. / 1,2-dichloroethane, 700 g. |
| 14 | L-methionine NCA, 50 g. | Tetrachloroethylene, 400 g. |
| 15 | γ-methyl-L-glutamate NCA, 30 g. / L-leucine NCA, 30 g. | N,N-dimethylformamide, 400 g. / 1,2-dichloroethane, 350 g. |
| 16 | γ-methyl-D-glutamate NCA, 30 g. / D-alanine NCA, 40 g. | N,N-dimethylformamide, 200 g. / 1,2-dichloroethane, 350 g. |
| 17 | O¹, O²-di(γ-glutamyl) ethylene glycol NCA, 60 g. | Dimethylsulfoxide, 100 g. / 1,2-dichloroethane, 700 g. |

| Ex. | Initiator | Amino acid urethane polymer treating agents |
|---|---|---|
| 10 | Triethylamine, 1.5 g. | Ethylenediamine, 0.082 g. |
| 11 | Tri-n-butylamine, 1.0 g. | 1,4-diaminocyclohexane, 0.072 g. |
| 12 | Diethylamine, 1.3 g. | Tetramethyleneglycol, 0.095 g. |
| 13 | Triethanolamine, 1.1 g. | Trimethylolpropane, 0.084 g. |
| 14 | Triethylenediamine, 1.3 g. | 4,4'-diaminodiphenylmethane, 0.078 g. |
| 15 | Triethylamine, 1.2 g. | 1,3-cyclohexanediol, 0.094 g. |
| 16 | Diethylamine, 1.5 g. | Biphenylenediamine, 0.080 g. |
| 17 | Triethylamine, 2.1 g. | Hydrazine, 0.068 g. |

EXAMPLE 18

A polymer solution is obtained according to the procedures of Example 4 except that 32.8 g. of a polyester diol consisting of adipic acid and ethylene glycol and having an OH value of 56 sold under the trademark Nippolan 4040 is used in place of 46 g. of polyoxytetramethylene glycol.

A transparent film is obtained from the polymer solution in the conventional manner.

The treated transparent film is compared with an untreated film prepared from the polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 2.1 kg./mm.² | 2.6 kg./mm.² |
| Elongation | 250% | 300% |
| Shrinkage coefficient | Shrinkage was hardly observed (230%). | Shrinkage was hardly observed (280%). |

The amino acid-urethane polymer film treated with water:

| Property | Direction | |
|---|---|---|
| | Longitudinal | Lateral |
| Tensile strength | 2.4 kg./mm.² | 2.7 kg./mm.² |
| Elongation | 450% | 480% |
| Shrinkage coefficient | 40% (430%) | 43% (460%) |

EXAMPLE 19

A polymer solution is obtained according to the procedures of Example 5 except that 30.0 g. of a polyester diol consisting of adipic acid and diethylene glycol and having an OH value of 41 sold under the the trademark Nippolan 1004 is used in place of 24 g. of polyoxytetramethyleneglycol.

A transparent film is obtained from the polymer solution in the conventional manner.

The treated transparent film is compared with an untreated film prepared from the polymer solution and the results are shown below.

The untreated amino acid-urethane polymer film:

| Property | Direction | |
|---|---|---|
| | Longitudinal | Lateral |
| Tensile strength | 2.0 kg./mm.² | 2.4 kg./mm.² |
| Elongation | 200% | 210% |
| Shrinkage coefficient | Shrinkage was hardly observed (180%). | Shrinkage was hardly observed (190%) |

The amino acid-urethane polymer film treated with ethylene glycol:

| Property | Direction | |
|---|---|---|
| | Longitudinal | Lateral |
| Tensile strength | 2.3 kg./mm.² | 2.5 kg./mm.² |
| Elongation | 500% | 550% |
| Shrinkage coefficient | 45% (480%) | 47% (530%) |

EXAMPLE 20

60 g. of a polyester diol consisting of adipic acid and diethylene glycol and having an OH value of 41 sold under the trademark Nippolan 1004, 10.0 g. of 4,4'-diphenylmethane diisocyanate and 40 g. of dioxane are reacted at 100° C. for two hours with stirring to give a prepolymer having terminal isocyanate groups. Immediately, 1,050 g. of 1,2-dichloroethane are added thereto and then 73.0 g. of γ-methyl-L-glutamate N-carboxy anhydride are added and the mixture is stirred at room temperature for two hours followed by the addition of 70 g. of N,N-dimethylformamide and 1.31 g. of triethylamine, a polymerization initiator, and stirring is continued for 10 hours. The mixture is then heated close to the boiling point and the reaction is continued for one hour to give a viscous solution. 0.085 g. of 4,4'-diamino-3,3'-dichlorodiphenylmethane are then added to the polymer solution and the mixture is stirred at a room temperature for 8 hours, and then heated at 80° C. for one hour to give a polymer solution with a viscosity of 380 cps.

A transparent film is obtained from the polymer solution in the conventional manner.

The treated transparent film is compared with an untreated film prepared from the polymer solution and the results are shown below. (The thickness of the films is 0.04 to 0.05 mm.)

The untreated amino acid-urethane polymer film:

| Property | Direction | |
|---|---|---|
| | Longitudinal | Lateral |
| Tensile strength | 1.9 kg./mm.² | 2.0 kg./mm.² |
| Elongation | 250% | 270% |
| Shrinkage coefficient | Shrinkage was hardly observed (230%). | Shrinkage was hardly observed (250%). |

The amino acid-urethane polymer film treated with 4,4'-diamino-3,3'-dichlorodiphenylmethane:

| Property | Direction | |
|---|---|---|
| | Longitudinal | Lateral |
| Tensile strength | 2.3 kg./mm.² | 2.5 kg./mm.² |
| Elongation | 550% | 580% |
| Shrinkage coefficient | 45% (530%) | 45% (560%) |

EXAMPLE 21

A polymer solution is obtained according to the procedures of Example 6 except that 210 g. of a polyester diol obtained by the condensation polymerization of phthalic acid anhydride and tetramethylene glycol and having an OH value of 75 is used in place of 200 g. of polyoxypropylene glycol.

A transparent film is obtained from the polymer solution in the conventional manner.

The treated transparent film is compared with an untreated film prepared from the polymer solution and the results are shown below.

The untreated amino acid-urethane polymer film:

| Property | Direction | |
|---|---|---|
| | Longitudinal | Lateral |
| Tensile strength | 2.1 kg./mm.² | 2.2 kg./mm.² |
| Elongation | 250% | 270% |
| Shrinkage coefficient | Shrinkage was hardly recognized (230%). | Shrinkage was hardly recognized (250%). |

The amino acid-urethane polymer film treated with hydrazine:

| Property | Direction | |
|---|---|---|
| | Longitudinal | Lateral |
| Tensile strength | 2.3 kg./mm.² | 2.5 kg./mm.² |
| Elongation | 480% | 500% |
| Shrinkage coefficient | 43% (450%) | 45% (470%) |

EXAMPLE 22

A polymer solution is obtained according to the procedures of Example 7 except that 75 g. of a polyester diol obtained by the reacting ethylene glycol with a mixture of adipic acid and phthalic acid in a molar ratio of 1:1, having an OH value of 56, is used in place of 65 g. of polyoxytetramethylene glycol.

A transparent film is obtained from the polymer solution in the conventional manner.

The elongation and resilience of the treated transparent film is improved as compared with a film obtained from the polymer solution before treatment with hexamethylenediamine.

EXAMPLE 23

50 g. of dioxane are added to 24 g. of a polyester diol having an OH value of 56 obtained from a mixture of adipic acid and phthalic acid in a molar ratio of 1:1 ethylene glycol and 3.0 g. of lysine diisocyanate methylester and reacted at 100° C. for three hours with stirring to give a prepolymer having terminal isocyanate groups. Immediately, a polymer solution obtained separately by polymerizing 90.0 g. of γ-benzyl-D-glutamate N-carboxy anhydride in 600 g. of 1,2-dichloroethane and 1.0 g. of triethylamine as a polymerization initiator are added thereto.

The reaction mixture is heated to 75 to 80° C. for one hour with stirring to give a polymerization solution having a viscosity of 2000 to 2500 cps.

0.05 g. of benzidine are added to the polymer solution with stirring and reacted at room temperature for five hours, and then, while following the residual isocyanate groups in the polymer solution by infrared absorption spectrum, additional increments of 0.01 g. of benzidine are added every 30 minutes until the isocyanate absorption peak disappears to give a polymer solution with a viscosity of 800 to 850 cps.

The untreated amino acid-urethane polymer film;

| Property | Direction | |
|---|---|---|
| | Longitudinal | Lateral |
| Tensile strength | 1.6 kg./mm.² | 1.8 kg./mm.² |
| Elongation | 230% | 250% |
| Shrinkage coefficient | Shrinkage was hardly recognized (200%). | Shrinkage was hardly recognized (220%). |

The amino acid-urethane polymer film treated with benzidine:

| Property | Direction | |
|---|---|---|
| | Longitudinal | Lateral |
| Tensile strength | 2.3 kg./mm.² | 2.4 kg./mm.² |
| Elongation | 400% | 430% |
| Shrinkage coefficient | 30% (380%) | 33% (410%) |

EXAMPLE 24

A prepolymer having terminal isocyanate groups is obtained by reacting 20.0 g. of a polyester diol having an OH value of 56 comprising adipic acid and ethylene glycol sold under the trademark Nippolan 4040, and 4.2 g. of lysine diisocyanate methylester at 100° C. for 1.5 hours. Immediately, 16.0 g. of N,N-dimethylformamide and 200.0 g. of 1,1,2-trichloroethylene are added thereto with stirring to give a uniform solution. A polymer solution having a viscosity of 1000 cps. (at 20° C.) obtained separately by polymerizing 98.0 g. of γ-methyl-L-glutamate N-carboxy anhydride in 675 g. of 1,2-dichloroethane and 1.8 g. of triethylamine as a polymerization initiator are added thereto.

The mixture solution is heated to 75 to 80° C. for one hour with stirring to give a polymerization solution having a viscosity of 850 cps.

A colorless transparent film is obtained from the polymer solution in the conventional manner.

The film is then dipped in a 3% ethylenediamine aqueous solution for one day and then dried with hot air (70° C.). The treated film is compared with an untreated film prepared from the polymer solution and the results are shown below.

The untreated amino acid-urethane polymer film:

| Property | Direction | |
|---|---|---|
| | Longitudinal | Lateral |
| Tensile strength | 2.1 kg./mm.² | 2.2 kg./mm.² |
| Elongation | 250% | 260% |
| Shrinkage coefficient | Shrinkage was hardly recognized (220%). | Shrinkage was hardly recognized (230%). |

The amino acid-urethane polymer film treated with ethylenediamine:

| Property | Direction | |
|---|---|---|
| | Longitudinal | Lateral |
| Tensile strength | 2.3 kg./mm.$^2$ | 2.5 kg./mm.$^2$ |
| Elongation | 500% | 550% |
| Shrinkage coefficient | 45% (450%) | 45% (500%) |

EXAMPLE 25

A prepolymer having terminal isocyanate groups is obtained by reacting 27.0 g. of a polyester diol having an OH value of 41 comprising adipic acid and diethylene glycol, sold under the trademark Nippolan 1004, and 4.2 g. of lysine diisocyanate methylester in 31 g. of dioxane at 100° C. for 2.5 hours. Immediately, a polymer solution obtained separately by polymerizing 12.0 g. of γ-ethyl-L-glutamate N-carboxy anhydride in 774 g. of 1,2-dichloroethane and 70 g. of N,N-dimethylformamide and 1.7 g. of triethylamine as a polymerization initiator at room temperature for 30 minutes are added thereto. Then, 100.0 g. of γ-ethyl-L-glutamate N-carboxy anhydride are added thereto and the reaction mixture is heated to 75 to 80° C. for two hours with stirring to give a polymerization solution.

0.05 g. of 4,4'-diamino-3,3'-dichlorodiphenylmethane are added to the polymer solution with stirring at room temperature for 8 hours. The solution is then heated at 80° C. for 1 hour to give a polymer solution with a viscosity of 250 cps.

A transparent film is obtained from the polymer solution in the conventional manner.

The treated film is compared with an untreated film prepared from the polymer solution and the results are shown below:

The untreated amino acid-urethane polymer film:

| Property | Direction | |
|---|---|---|
| | Longitudinal | Lateral |
| Tensile strength | 2.0 kg./mm.$^2$ | 2.1 kg./mm.$^2$ |
| Elongation | 200% | 250% |
| Shrinkage coefficient | Shrinkage was hardly recognized (180%) | Shrinkage was hardly recognized (230%) |

The amino acid-urethane polymer film treated with 4,4'-diamino-3,3'-dichlorodiphenylmethane:

| Property | Direction | |
|---|---|---|
| | Longitudinal | Lateral |
| Tensile strength | 2.2 kg./mm.$^2$ | 2.5 kg./mm.$^2$ |
| Elongation | 450% | 470% |
| Shrinkage coefficient | 43% (420%) | 44% (440%) |

EXAMPLE 26

An unrteated film prepared from the polymer solution of Example 25, is dipped in a 3% 1,4-diaminocyclohexamethylenediamine aqueous solution for 60 minutes, and washed with water and dried with hot air (70° C.). The tensile strength, elongation and shrinkage of the treated film are given below, and when these results are compared with the results of the untreated film of Example 25, it can be readily seen that the elongation and resilience of the treated film of Example 26, are greatly improved.

The amino acid-urethane polymer film treated with 4,4'-diamino-3,3'-dichlorodiphenylmethane:

| Property | Direction | |
|---|---|---|
| | Longitudinal | Lateral |
| Tensile strength | 2.0 kg./mm.$^2$ | 2.3 kg./mm.$^2$ |
| Elongation | 400% | 430% |
| Shrinkage coefficient | 40% (380%) | 41% (410%) |

EXAMPLES 27–34

Prepolymers are prepared according to the following procedures using the components as shown in Table 3. A diisocyanate component, a solvent A and a catalyst are added to the polyester polyol component and stirred at 80 to 100° C. for three hours to obtain prepolymers.

A solvent B as shown in Table 4 is added to the prepolymer, and then the ANCA component is added thereto, and stirred at room temperature for one hour. A polymerization initiator is added thereto and the polymerization is continued for 10 hours and then heated at 80° C. for one hour to obtain a polymer solution.

A treating agent as shown in Table 4 is added to the polymer solution and stirred at room temperature for five hours and then heated at 80° C. for one hour to obtain a polymer solution.

A colorless transparent film prepared from the polymer solution has a far improved elongation and resilience as compared with the film obtained from the untreated polymer solution.

TABLE 3

| Ex. | Diisocyanate component | Polyester polyol component | | | | Catalyst | Solvent A |
|---|---|---|---|---|---|---|---|
| | | Dibasic acid or lactone | Polyol | Molecular weight | Amount, g. | | |
| 27 | 4,4'-diphenylmethane diisocyanate, 10 g. | Succinic acid | Propylene glycol | 1,350 | 24 | None | Dioxane, 40 g. |
| 28 | 2,4-tolylene diisocyanate, 28 g. | Dimerized linolenic acid. | Hexamethylene glycol. | 1,500 | 100 | do | N,N-dimethylformamide, 30 g., dioxane, 30 g. |
| 29 | Lysine diisocyanate ethylester, 8.5 g. | Azelaic acid | 1,3-butane diol | 2,000 | 40 | Triethylamine, 0.05 g. | N,N-dimethylacetoamide, 30 g. |
| 30 | Ornithine diisocyanate ethylester, 8.9 g. | Phthalic acid | Diethylene glycol | 1,380 | 46 | N-methylmorpholine, 0.04 g. | 2-ethoxyethylacetate, 50 g. |
| 31 | Hexane-1,6-diisocyanate, 10 g. | ε-Caprolactone | Ethylene glycol | 500 | 50 | Diethylethanol amine, 0.05 g. | Dioxnae, 30 g. |
| 32 | Cyclohexylmethane-4,4'-diisocyanate, 10 g. | Phthalic acid, Adipic acid (1:1). | do | 600 | 35 | Dibutyl tin dilaurate, 0.03 g. | Do. |
| 33 | 4,4'-diphenylmethane diisocyanate, 24 g. | Adipic acid | Diethylene glycol, Trimethylol propane (10:1). | 1,600 | 35 | None | Do. |
| 34 | Lysine diisocyanate methylester, 9.0 g. | do | Ethylene glycol, propylene glycol (1:1). | 2,000 | 40 | do | Do. |
| 35 | Lysine diisocyanate methylester, 9.0 g. | Azelaic acid | 1,3-butane diol | 2,000 | 40 | do | Dioxane, 50 g. |

TABLE 4

| Ex. | ANCA component | Solvent B |
|---|---|---|
| 27 | γ-Ethyl-L-glutamate NCA, 75 g. | Perchlene, 150 g., 1,2-dichloroethane, 450 g. |
| 28 | γ-Isobutyl-L-glutamate NCA, 70 g. | Trichloroethylene, 800 g. |
| 29 | γ-Cyclohexyl-L-glutamate NCA, 70 g. | 1,2-dichloroethane, 850 g. |
| 30 | β-Ethyl-L-aspartate NCA, 65 g. | Perchlene, 100 g., 1,2-dichloroethane 700 g. |
| 31 | L-methionine NCA, 50 g. | Tetrachloroethane, 400 g. |
| 32 | γ-Methyl-L-glutamate NCA, 30 g., L-leucine NCA, 30 g. | N,N-dimethylformamide, 400 g., 1,2-dichloroethane, 350 g. |
| 33 | γ-Methyl-L-glutamate NCA, 30 g., D-alanine NCA, 40 g. | N,N-dimethylformamide, 200 g., 1,2-dichloroethane, 350 g. |
| 34 | O¹,O²-di(γ-glutamyl ethylene glycol NCA, 60 g. | Dimethylsulfoxide, 100 g., 1,2-dichloroethane, 700 g. |
| 35 | Phenylglycine, 40 g. | Diethylacetamide, 150 g., 1,2-dichloroethane, 500 g. |

| | Polymerization initiator | Treating agent for amino acid-urethane polymer |
|---|---|---|
| 27 | Triethylamine, 1.5 g. | Ethylenediamine, 0.08 g. |
| 28 | Tri-n-butylamine 1.0 g. | Hexamethylenediamine, 0.074 g. |
| 29 | Diethylamine, 1.3 g. | Tetramethylene glycol, 0.095 g. |
| 30 | Triethanolamine 1.1 g. | Trimethylolpropane, 0.050 g. |
| 31 | Triethylenediamine 1.3 g. | 4,4'-diaminodiphenylmethane, 0.078 g. |
| 32 | Triethylamine 1.2 g. | 1,3-cyclohexanediol, 0.094 g. |
| 33 | Diethylamine, 1.5 g. | Biphenylenediamine, 0.080 g. |
| 34 | Triethylamine, 2.1 g. | Hydrazine, 0.068 g. |
| 35 | Tri-n-propylamine, 1.8 g. | Water, 0.030 g. |

What we claim is:

1. Amino acid-urethane polymer compositions prepared by reacting
   (i) the reaction product of
      (A) an isocyanate terminated intermediate polymer obtained by the reaction of a polyether polyol or a polyester polyol with a polyisocyanate compound; and
      (B) an amino acid compound selected from the group consisting of
         (a) an amino acid N-carboxy anhydride of the general formulae:

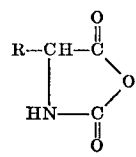

(1)

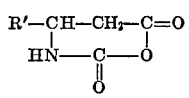

(2)

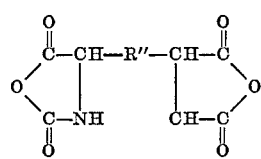

(3)

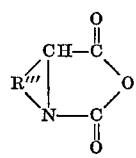

(4)

wherein R and R' are hydrogen or monovalent hydrocarbon groups selected from the group consisting of alkyl groups containing from 1 to 6 carbon atoms; aralkyl groups containing from 7 to 10 carbon atoms; aryl groups containing from 6 to 10 carbon atoms; hydroxyalkyl groups containing from 1 to 6 carbon atoms; hydroxyaralkyl groups containing from 7 to 10 carbon atoms; hydroxyaryl groups containing from 6 to 10 carbon atoms; thioalkyl groups containing from 1 to 6 carbon atoms; aminoalkyl groups containing from 1 to 6 carbon atoms; guanido alkyl groups containing from 1 to 6 carbon atoms; nitrogen containing heterocyclic groups containing from 4 to 10 carbon atoms or groups of the formula $C_nH_{2n}COOR_a$ wherein $n$ is an integer from 1 to 6 and $R_a$ is an alkyl, cycloalkyl or aralkyl group containing from 1 to 8 carbon atoms; R'' and R''' are alkylene groups containing from 1 to 6 carbon atoms or groups of the formula

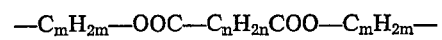

wherein $m$ and $n$ is an integer from 1 to 6; and
         (b) a polyamino acid obtained from the polymerization of (a); or
   (ii) the shaped products manufactured from (i);
with a compound selected from the group consisting of water, a polyol, a polyamine or mixtures thereof.

2. The composition of claim 1 wherein the polyether polyol is the reaction product of a dehydration condensation of a polyol containing from 2 to 20 carbon atoms and has a molecular weight in the range of about 200 to 10,000.

3. The composition of claim 1 wherein the polyether polyol comprises a polyoxytetramethylene glycol.

4. The composition of claim 1 wherein the polyester polyol is the reaction product of a polycarboxylic acid containing from 2 to 20 carbon atoms and a polyol selected from the group consisting of diols and triols containing from 2 to 20 carbon atoms and has a molecular weight in the range of about 200 to 10,000.

5. The composition of claim 1 wherein the polyester polyol is formed from adipic acid and diethylene glycol.

6. The composition of claim 1 wherein the polyisocyanate compound comprises an aliphatic diisocyanate compound containing ester groups.

7. The composition of claim 1 wherein the polyisocyanate compound comprises lysine diisocyanate methylester.

8. The composition of claim 1 wherein the amino acid compound comprises an amino acid N-carboxy anhydride.

9. The composition of claim 1 wherein the amino acid compound comprises γ-methyl-L-glutamate N-carboxy anhydride.

10. The composition of claim 1 wherein the compound in (ii) comprises water.

11. The composition of claim 1 wherein the compound in (ii) comprises an aliphatic diol containing from 1 to 10 carbon atoms.

12. The composition of claim 1 wherein the compound in (ii) comprises an aliphatic diamine containing from 1 to 10 carbon atoms.

13. A process for the preparation of amino acid-urethane polymer compositions comprising reacting
   (i) the reaction product of
      (A) an isocyanate terminated intermediate polymer obtained by the reaction of a polyether polyol or a polyester polyol with a polyisocyanate compound; and
      (B) an amino acid compound selected from the group consisting of (a) an amino acid N-carboxy anhydride of the general formulae:

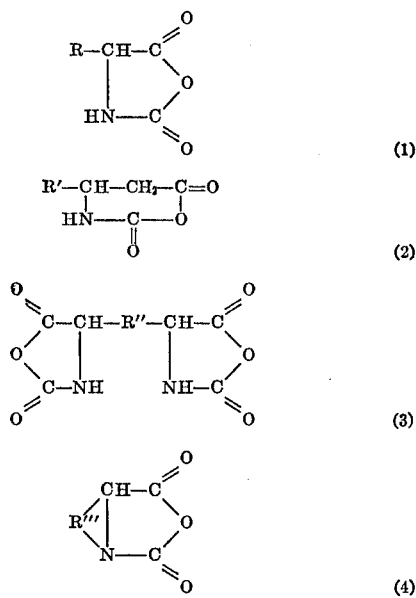

wherein R and R' are hydrogen or monovalent hydrocarbon groups selected from the group consisting of alkyl groups containing from 1 to 6 carbon atoms; aralkyl groups containing from 7 to 10 carbon atoms; aryl groups containing from 6 to 10 carbon atoms; hydroxyalkyl groups containing from 1 to 6 carbon atoms; hydroxyaralkyl groups containing from 7 to 10 carbon atoms; hydroxyaryl groups containing from 6 to 10 carbon atoms; thioalkyl groups containing from 1 to 6 carbon atoms; aminoalkyl groups containing from 1 to 6 carbon atoms; guanido alkyl groups containing from 1 to 6 carbon atoms; nitrogen containing heterocyclic groups containing from 4 to 10 carbon atoms or groups of the formula $C_nH_{2n}COOR_a$ wherein $n$ is an integer from 1 to 6 and $R_a$ is an alkyl, cycloalkyl or aralkyl group containing from 1 to 8 carbon atoms; R'' and R''' are alkylene groups containing from 1 to 6 carbon atoms or groups of the formula $$-C_mH_{2m}-OOC-C_nH_{2n}-COO-C_mH_{2m}-$$

wherein $m$ and $n$ is an integer from 1 to 6; and
(b) a polyamino acid obtained from the polymerization of (a); or
(ii) the shaped products manufactured from (i);
with a compound selected from the groups consisting of water, a polyol, a polyamine or mixtures thereof.

References Cited
UNITED STATES PATENTS 3,594,351   7/1971   Uchida et al. _____ 260—77.5 CA DONALD E. CZAJA, Primary Examiner M. J. WELSH, Assistant Examiner U.S. Cl. X.R.

260—75 NK, 75 NA